May 5, 1970   W. H. WOLFF ET AL   3,510,016
AUTOMOBILE TOWING TRAILER
Filed Nov. 29, 1968   4 Sheets-Sheet 4

INVENTORS
WILLIAM H. WOLFF
SAMUEL J. MINK. II,
BY
*Browne Schuyler & Beveridge*
ATTORNEYS

United States Patent Office 3,510,016
Patented May 5, 1970

---

3,510,016
AUTOMOBILE TOWING TRAILER
William H. Wolff, West Chester, and Samuel J. Mink II, Newtown Square, Pa., assignors to Wolmin Enterprises, Incorporated, Westchester, Pa., a corporation of Pennsylvania
Filed Nov. 29, 1968, Ser. No. 779,847
Int. Cl. B60p *3/12*
U.S. Cl. 214—86    22 Claims

ABSTRACT OF THE DISCLOSURE

An automobile towing trailer including a rigid frame adapted to be connected to a towing vehicle, and a hoist supported on the frame for engaging, lifting and towing one end of an automobile. The hoist is mounted for pivotal movement about a king pin on the rigid frame, and for longitudinal movement over the frame to adjust the position of an automobile being towed relative to the trailer.

---

This invention relates to automobile towing trailers, and more particularly to an improved, light-weight trailer particularly useful in towing disabled vehicles behind conventional road vehicles.

Numerous trailers have been constructed in the past for supporting one end of an automobile, and particularly a disabled automobile, for towing the automobile over the road with the other end of the towed automobile trailing behind on two of its own wheels. However, these prior art tow trailer devices have not been entirely satisfactory for various reasons. For example, it has generally been difficult to load an automobile onto them particularly when they have been employed to tow a disabled vehicle, and it has not generally been possible to vary the position of the towed vehicle on the trailer to provide the desired load distribution on the trailer. In addition, difficulty has been encountred in providing a stable, articulated support for the towed vehicle to facilitate tracking of the towed vehicle around curves or the like. Accordingly, it is an object of the present invention to provide an improved automobile towing trailer.

Another object of the invention is to provide an automobile towing trailer including an improved hoist mechanism for loading a vehicle onto the trailer.

Another object of the invention is to provide an automobile towing trailer including a hoist mounted for pivotal movement about a king pin on a rigid frame of the towing trailer, and for longitudinal movement over the frame to adjust the position of a towed vehicle on the trailer.

Another object of the invention is to provide an automobile towing trailer having such an improved hoist mechanism and further including rigid platform means engaging the forward wheels of the towed vehicle to provide stability between the trailer and the towed vehicle.

In the attainment of the foregoing and other objects, an important feature of the invention resides in providing a trailer including a rigid frame having a forwardly projecting tongue adapted to be attached to a towing vehicle and road wheels mounted at each side of the rigid frame for supporting the trailer for movement over the road. An elongated frame is mounted on the rigid frame by a king pin for pivotal movement about a vertical axis on the rigid frame, and a hoist is mounted on the elongated frame for sliding movement therealong. Thus, the hoist may be slid along the elongated frame from a vehicle loading position at the rear of the trailer to a vehicle towing position spaced forwardly from the loading position. At the same time, the hoist is free to pivot with the elongated frame about the king pin to provide an articulated support between the trailer and the towed vehicle whereby the towed vehicle will track around a curve without placing undue stresses on the trailer or hoist structure.

Other objects and advantages of the invention will become apparent from the following detailed description, taken with the drawings, in which.

Figure 1:
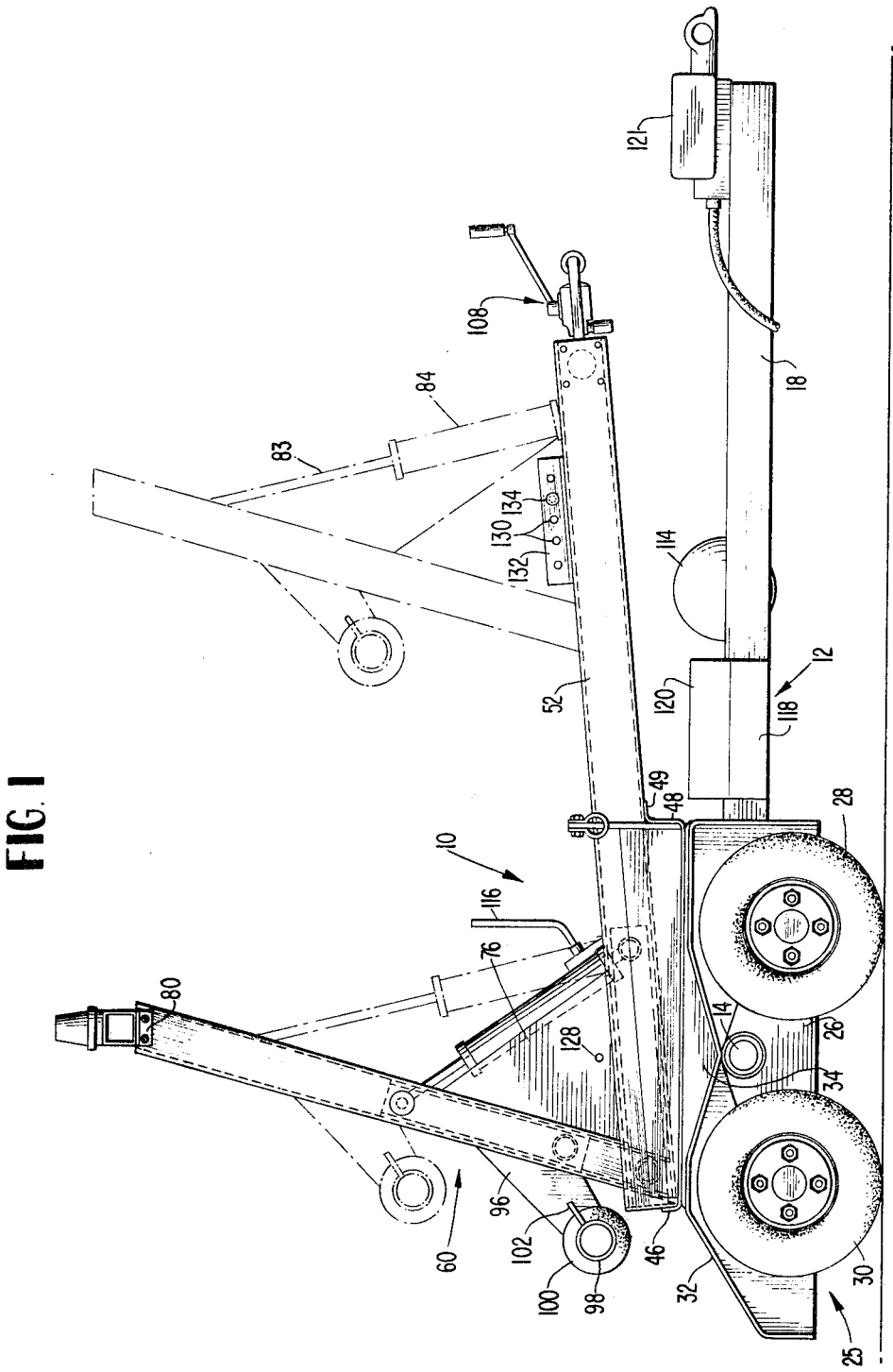
FIG. 1 is a side elevation view of a tow trailer according to the present invention, with certain parts being illustrated in alternate positions in phantom line.

Referring now to the drawings in detail, an improved trailer according to the present invention is indicated generally by the reference numeral 10 and includes a rigid A-frame structure 12 defined by a transversely extending axle member 14 and a pair of forwardly extending structural channel members 16, 18. The channel members 16, 18 each have one end joined to the axle 14 at points spaced from the end thereof, and have their opposed ends rigidly joined at the forward end of the trailer by a suitable gusset 20. Channels 16, 18 thus define a rigid, forwardly extending tongue for the trailer. A metal platform 22 having a horizontal upper surface 24 is rigidly mounted, as by welding, on the axle 14 and frame members 16, 18 to reinforce the frame and to provide support for a hoist mechanism to be described hereinbelow.

Figure 6:
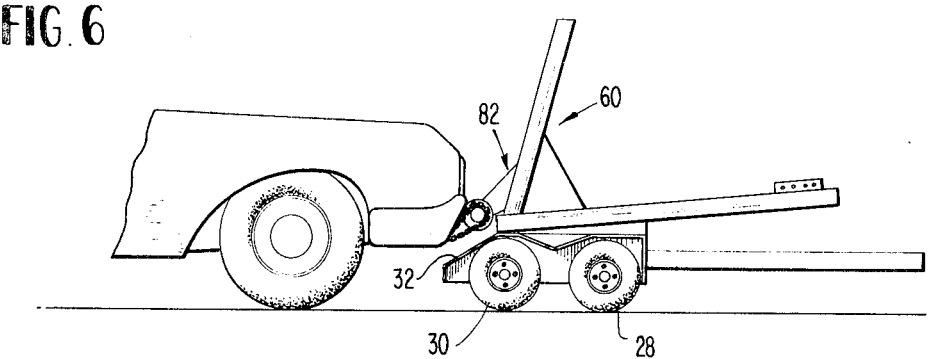
FIGS. 6–8 are schematic views illustrating successive steps in loading an automobile onto the trailer.
Figure 7:
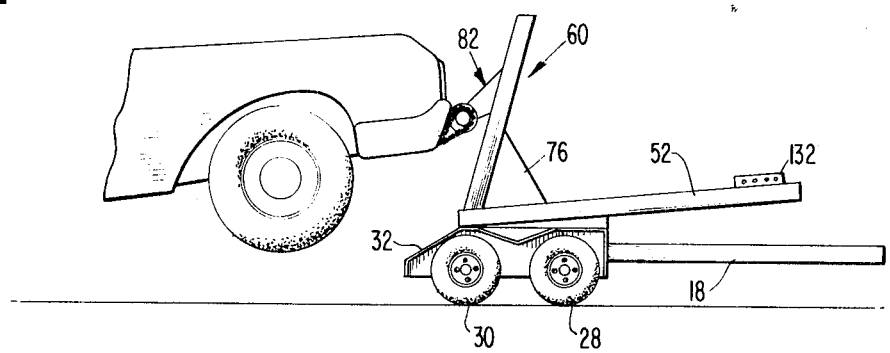
Figure 8:
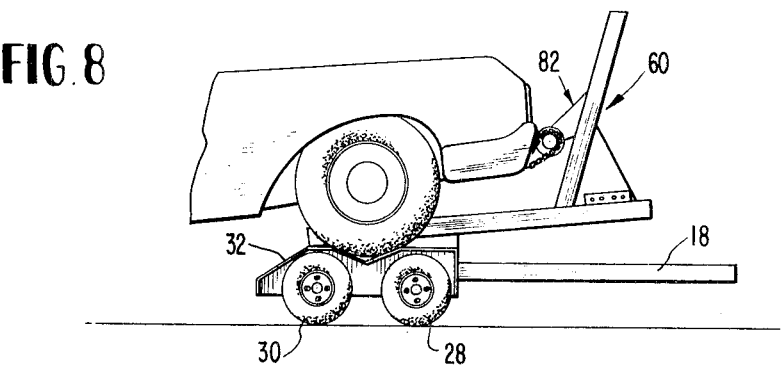

The rigid frame 12 is supported at each longitudinal side thereof for rolling movement over a road surface by a dolly 25 mounted one on each end of axle 14. Each dolly 25 includes an arm 26 pivotally mounted on the end of axle 14, with a first pair of laterally spaced wheels 28 rotatably mounted on its front end and a second pair of similar laterally spaced wheels 30 rotatably mounted on its rear end. The pairs of wheels 28, 30 are preferably relatively small in comparison to standard automobile wheels, as indicated in FIGS. 6–8, to give a low profile to the trailer and thereby maintain the center of gravity of the loaded trailer as low as possible. Further, the pairs of wheels 28, 30 are mounted relatively close to one another so that the vehicle maneuvers as a single axle trailer.

Each dolly 25 includes a relatively heavy metal fender 32 covering the associated two pair of wheels, with the fenders 32 being attached to the associated arm 26 for pivotal movement therewith around axle 14 to prevent contact of the underside of the fender with the wheels 28, 30. The fenders 32 each are provided with a shallow, V-shaped depression 34 in their upper surface, with the bottom of the depression being generally parallel to and spaced above the axle 14 to provide a shallow cradle for the wheels of an automobile being towed by the trailer.

A flat metal plate 36 is positioned on horizontal surface 24, and supported for relative rotation thereon by a king pin structure 38 disposed on the longitudinal centerline of the trailer above axle 14. King pin 38 includes a hollow headed bolt 40, a nut 42, and a pair of bearing washers 44 disposed one between the head of the bolt 40 and plate 36 and another between platform 22 and nut 42. Lubrication may be applied between plate 36 and surface 24 through fitting 43.

Plate 36 has an upwardly directed flange 46 extending across its rear edge, and upwardly extending flange 48 terminating in an outwardly extending ledge 49 formed along its forward edge. Welded to flanges 46 and to ledge 49 for movement with plate 36 about king pin 38 is a pair of laterally spaced, elongated structural channel members 50, 52 joined at their forward end by a suitable structural member 54. Plate 36, channels 50 and 52, and structural member 54 cooperate to define a movable frame, with channels 50, 52 having their open faces 56, 58 directed toward one another to define an elongated track slidably supporting an upwardly extending hoist mechanism 60.

Hoist 60 includes a mast made up of a pair of parallel, laterally spaced structural channels 62, 64 each rigidly joined at their base to a second pair of relatively short, parallel structural channel members 66, 68 disposed between one adjacent each of the channels 50, 52. A rigid tubular spacer member 70 is welded to and joins the forward end of channel members 66, 68 and maintains them in their spaced relation, with the ends of tube 70 extending through the respective joined channel members to project into the track defined by the open channels of structural channel members 50, 52. A second tubular spacer member 72 similarly joins the rear end of the channels 66, 68, with the tubular member 72 projecting into the open channels of members 50, 52. Thus, tubular members 70, 72 support hoist 60 for sliding movement along the elongated track defined by channels 50, 52 with the extent of travel being limited by member 54 and flange 46 of plate 36. A heavy metal gusset plate 74 is welded between channels 62 and 66, and a similar gusset 76 is welded between channel 64 and 69 to provide rigidity to the mast. Channels 62 and 64 are maintained in spaced relation at their upper ends by an elongated structural light bar 78 mounted thereon as by brackets 80.

A vehicle lifting carriage 82 is slidably supported for movement along channels 62, 64 by a suitable fluid motor including a cylinder 84 having one end pivotally mounted on tubular member 70, and a piston rod 85 pivotally mounted on a tubular cross-member 86 of the carriage. Member 86 has its ends disposed within the opposed, open channels of members 62, 64. A pair of short structural channel members 88, 90 each have their upper end rigidly connected to cross-member 86 and extend downwardly in closely spaced relation one adjacent each of the channel members 62, 64. Channels 88, 90 have their lower ends rigidly joined, as by welding, to second tubular cross-member 92 which has its ends projecting into the open channels of member 62, 64. Thus, tubular members 86, 92 slidably support the carriage 82 for movement up and down along a track defined by the channels 62, 64 between an elevated and a lowered position.

A plate bracket 94 is rigidly welded to channel member 88 and projects downwardly and rearwardly therefrom, and a similar plate bracket 96 is rigidly welded to channel member 90 and projects downwardly and rearwardly therefrom in spaced parallel relation to bracket 94. A lifting bar 98, made up of a length of steel pipe, is rigidly welded intermediate its ends to the distal ends of brackets 94, 96, with the ends of bar 98 extending in cantilevered relation outwardly from the plate brackets toward the sides of the trailer. A relatively thick cylinder 100 of reslient material, such as rubber or the like, is mounted on each end of the lifting bar 98 in position to engage the bumper of a vehicle to be towed, as will be described more fully hereinbelow. On a forward portion of the lifting bar 98, adjacent each end thereof and outboard of the respective resilient sleeves 100, is a rigid metal bracket 102, best seen in FIG. 2. Brackets 102 each have an opening 104 therein for securing one end of a length of chain (not shown), and an open-ended slot 106 for receiving and retaining a link of the chain.

Figure 2:
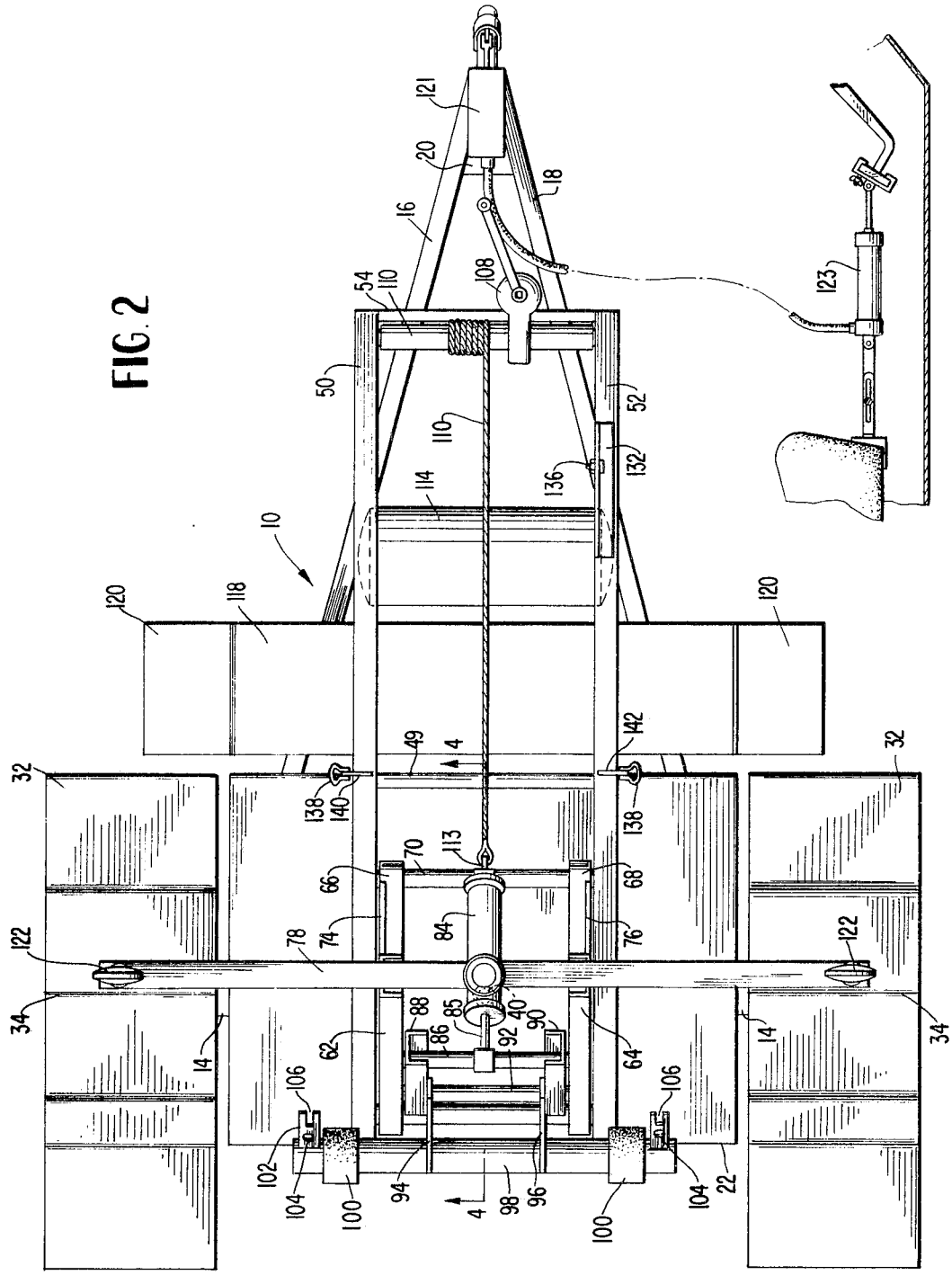
FIG. 2 is a top plan view of the trailer structure shown in FIG. 1.

As illustrated in FIGS. 1 and 2, the hoist 60 may be slid along the elongated track defined by the channels 50, 52 by a manually operated winch indicated generally at 108 and including a drum 110 mounted on the channels 50, 52. A cable 112 has an eye in one end secured to a hook 113 on tubular member 70 and has its other end wound around drum 110 to pull the hoist along the elongated track from the car lifting position indicated in full line in FIG. 1 to the car towing position adjacent the forward end of the track as indicated in phantom in FIG. 1. When the manually operated winch is employed, the hoist 60 will normally be slid manually from the car towing position to the car lifting position. If desired, however, the winch may be replaced with a motor such as a fluid cylinder which is operable to move the hoist in both directions along the track.

To actuate the fluid cylinder 84, a suitable reservoir, or tank 114 may be mounted on the frame 12 to contain a supply of high pressure air which is supplied to cylinder 84 through suitable means such as flexible conduit 116. Alternatively, a manually operated pump may be provided to supply pressure fluid to cylinder 84. A storage compartment for tools, or the like, indicated generally at 118, and having hinged doors 120 at each end thereof may be provided on the frame 12.

The trailer preferably employs a trailer hitch 121 of the type which incorporates a fluid cylinder and piston structure for supplying fluid pressure to a brake applying mechanism 123 in the towed vehicle when the trailer is attempting to overrun the towing vehicle. Such trailer hitches are commercially available and as such form no part of the present invention.

Figure 3:
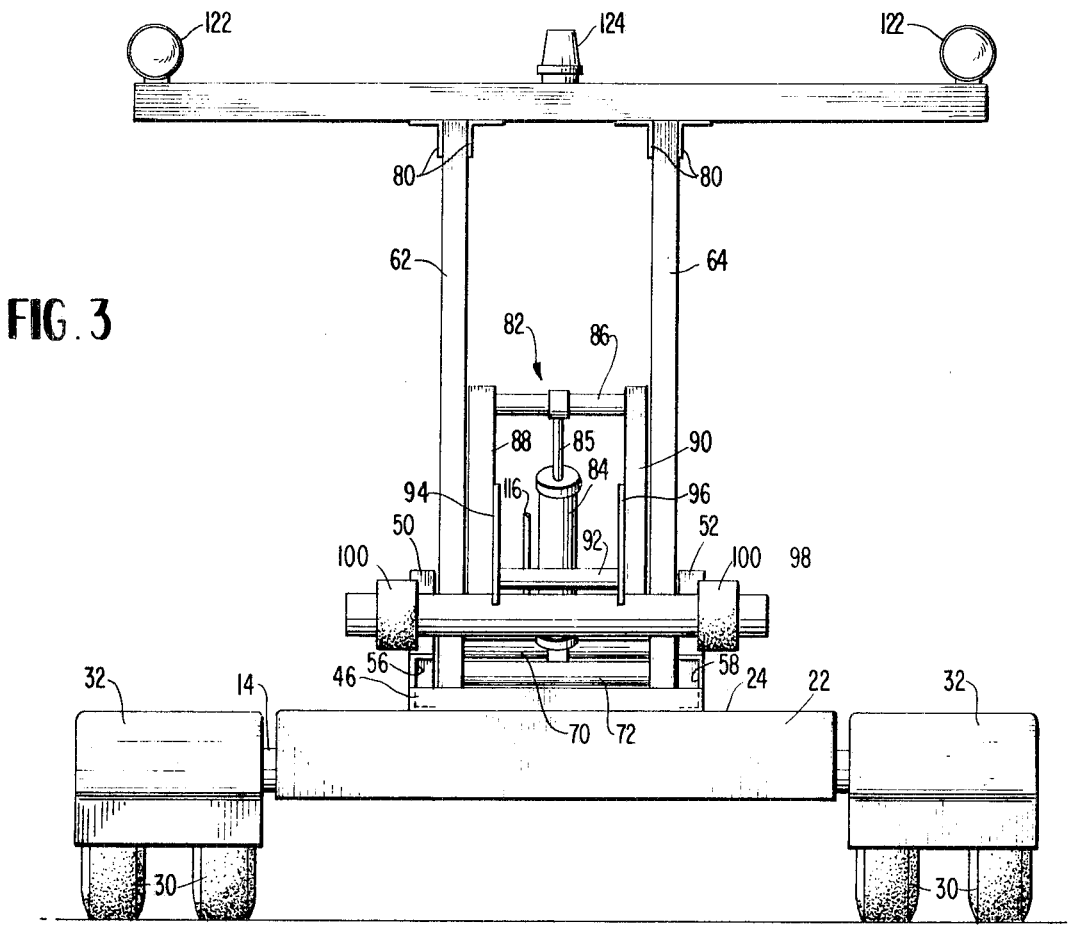
FIG. 3 is a rear end view of the trailer shown in FIGS. 1 and 2.
Figure 4:
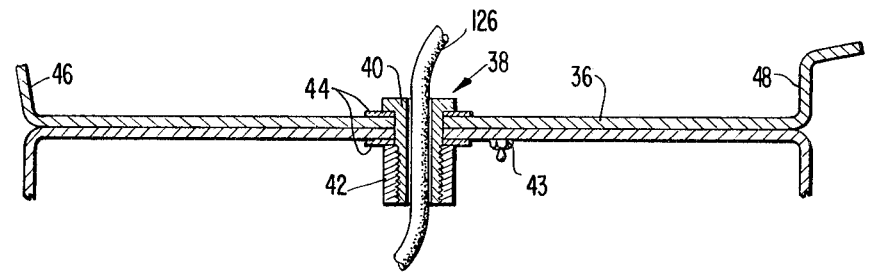
FIG. 4 is a fragmentary sectional view taken along line 4—4 of FIG. 2.

As indicated in FIGS. 2 and 3, the light bar 78 extends substantially the full width of the trailer at the top of the mast when the movable frame is in its normal position with channels 50, 52 disposed fore and aft of the trailer along the longitudinal centerline. A conventional flashing trouble light 122 is mounted adjacent each end of the light bar 78, and a conventional rotating warning beacon 124 is mounted in the center of the light bar. Electrical power is provided to the lights 122, 124, from the towing vehicle through a cable 126 extending through the hollow bolt 40 of kingpin structure 38, then upward along one of the channel members 62 or 64.

Referring now to FIGS. 6–8, the operation of the hoist mechanism to load a disabled vehicle will be described. First, with the movable frame in its normal fore and aft position, the hoist mechanism 60 is moved to the position illustrated in FIG. 6, in which the carriage 82 is in the lowered position and the hoist is in the rearmost, loading position. The trailer is then backed into alignment with one end of the automobile 140 (in this case, the front) with the two rubber bumpers 100 engaging the bumper of the automobile. One end of a length of chain is then secured in the opening 104 of bracket 102, and the chain is then extended beneath the bumper of the automobile, around the automobile frame, and then back and secured in the slot 106. This procedure is then repeated at the other end of the lifting bar 98 so that each end of the bar is secured through a length of chain to the automobile's frame.

Fluid under pressure is then directed through conduit 116 to cylinder 84 to lift carriage 82 to the elevated position shown in FIG. 7. In this position, the weight of the front of the automobile is supported by the lengths of chain which firmly retain the resilient bumpers 100 into engagement with the automobile bumper. Also, the sprung wheels of the automobile will drop somewhat below their normal position relative to the automobile frame as indicated in FIG. 7.

Winch 108 is then operated manually to slide the hoist 60 and the automobile supported thereby along the track defined by channels 50, 52 to position the automobile's front wheels directly above axle 14. If necessary, the position of hoist 60 is then adjusted slightly, to align an opening 128 in bracket 76 with the closest of a series of similar openings 130 in an angle bracket 132 rigidly welded on the top flange of channel 52. A bolt 134 is then positioned in the aligned openings and secured by a nut 136 to positively retain the hoist against sliding movement during towing of the automobile.

Referring again to FIG. 8, carriage 62 is then lowered to position the automobile's front wheels in the V-shaped depressions 34 of the fenders 32. If desired, carriage 82 may only be lowered enough so that a portion only of the weight of the towed automobile is supported on the fenders with the remainder being supported by the chains on the hoist 60. In this position, the automobile may be towed over the open road, with the towing force being transmitted to the towed vehicle through the hoist 60. Alternatively, and preferably if the automobile is to be towed for substantial distances, the full weight of the front of the automobile may be supported by the fenders 32. In this case, lengths of chain (not shown) may be extended around the automobile's frame and secured, as by clevises 138, to tie-down brackets 140, 142 on channels 50, 52, respectively. Thus, the force for towing the car can be transmitted through brackets 140, 142 directly from the movable frame, thereby relieving the stress on the hoist 60. In either arrangement, lifting bar 98 will act as a barrier positively preventing the towed automobile from overrunning the trailer. Further, the two sets of chains (i.e. those on lifting bar 98 and those on brackets 140, 142) provide a safety feature in the event of a chain breaking.

Figure 5:
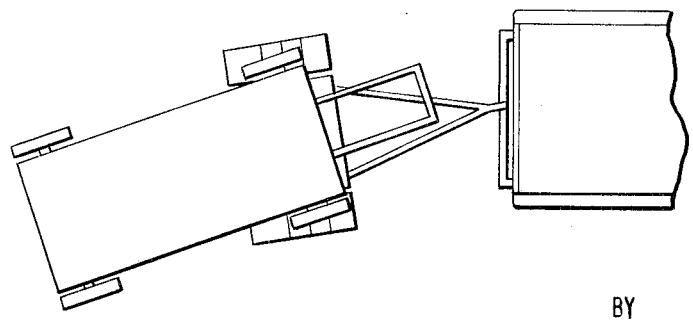
FIG. 5 is a schematic representation of the trailer being employed to tow an automobile around a curve.

Referring now to the schematic illustration of FIG. 5, as the towing vehicle, the trailer, and the towed vehicle round a curve, there will be a natural tendency for the trailer to turn with respect to the towed automobile. However, since the vehicle is firmly attached to each end of the lifting bar 98 (or to the channels 50, 52) by the short lengths of chain, relative turning between the hoist and the vehicle is not possible. Thus, in rounding a curve, all relative turning between the rigid frame of the towing trailer and the towed vehicle must be around the vertical axis of the king pin 38, with the hoist and track being constrained to remain in alignment with the towed vehicle. This will result in the supported wheels of the towed vehicle rolling slightly fore and aft in the depressions 34 of the associated fender 32; however, the configuration of the depressions is such that the wheels are not elevated sufficiently by this rolling action within the V-shaped depressions to materially affect the chains which are applying the towing force to the towed automobile.

Since the hoist 60 always maintains its position relative to the vehicle being towed, it follows that the light bar 78 remains perpendicular to the longitudinal axis of the towed vehicle and therefore remains clearly visible from the rear of the vehicle. This may be particularly important in towing a disabled vehicle having no lights particularly around sharp curves, corners, or the like, where lights of a conventional towing vehicle may be partially or completely obscured.

While we have disclosed a preferred embodiment of our invention, we wish it understood that we do not intend to be restricted solely thereto, but that we do intend to include all embodiments thereof which come within the spirit and scope of our invention.

We claim:
1. An automobile towing trailer comprising, a rigid frame including a forwardly projecting tongue portion adapted to be connected to a towing vehicle, wheel means rotatably mounted on each side of said rigid frame and supporting said trailer for movement over a road surface, hoist means for lifting and supporting one end of an automobile, track means supporting said hoist means for longitudinal movement on said rigid frame, and means supporting said track means on said rigid frame for rotation thereon about a generally vertical axis.

2. An automobile towing trailer as defined in claim 1 wherein said means supporting said track means on said rigid frame comprises king pin means positioned on the longitudinal centerline of said trailer.

3. An automobile towing trailer as defined in claim 2 wherein said track means comprises an elongated frame rotatable in either direction about said king pin from a normal position extending generally fore and aft along said longitudinal centerline.

4. An automobile towing trailer as defined in claim 3 further comprising means for moving said hoist means along said track means from a lifting position adjacent the rear end of said track means to a towing position spaced forwardly of said rear end.

5. An automobile towing trailer as defined in claim 4 wherein said means for moving said hoist means comprises winch means mounted on said elongated frame and operatively connected to said hoist means for slidably moving said hoist means along said track means.

6. An automobile towing trailer according to claim 1 wherein said hoist means comprises an upwardly extending mast, carriage means mounted on said mast for movement therealong between an elevated and a lowered position, and means for moving said carriage between said elevated and said lowered positions.

7. An automobile towing trailer as defined in claim 6 wherein said means for moving said carriage between said elevated and said lowered positions comprises fluid cylinder and piston means operatively connected between said carriage and a rigid portion of said hoist means, and means for supplying fluid under pressure to said cylinder and piston means.

8. An automobile towing trailer as defined in claim 7 wherein said means supporting said track means on said rigid frame comprises king pin means positioned on the longitudinal centerline of said trailer, and wherein said track means comprises an elongated frame rotatable in either direction about said king pin from a normal position extending generally fore and aft along said longitudinal centerline.

9. An automobile towing trailer as defined in claim 8 further comprising power means for moving said hoist means along said track means from a lifting position adjacent the rear end of said track means to a towing position spaced forwardly of said rear end.

10. An automobile towing trailer as defined in claim 1 further comprising vehicle wheel supporting means mounted on said rigid frame for engaging and supporting the wheels on said one end of an automobile being tower, said hoist means being operable to lift and move said one end of an automobile from a position at the rear of said trailer and deposit the wheels on said one end onto said wheel support means.

11. An automobile towing trailer as defined in claim 10 wherein said wheel support means comprises a pair of fenders mounted one over said wheel means on each side of said rigid frame, said fenders having a shallow depression formed in their respective upper surfaces for receiving said automonile wheels.

12. An automobile towing trailer as defined in claim 11 wherein said wheel means on each side of said rigid frame comprises elongated arm means pivotally mounted intermediate its ends on said frame for rotation about an axis perpendicular to the longitudinal centerline of said trailer, and a pair of wheels mounted in tandem one adjacent each end of said arm for rotation about axes parallel to the axis of rotation of said arm.

13. An automobile towing trailer as defined in claim 12 wherein said fenders are mounted on said arm for rotation therewith about the axis of rotation of said arm.

14. An automobile towing trailer as defined in claim 13 wherein said elongated frame further comprises tie-down means for securing an automobile supported on said trailer against movement relative to said elongated frame.

15. An automobile towing trailer comprising a rigid frame supported by wheel means mounted at each side thereof, forwardly projecting tongue means on said rigid frame adapted to be connected to a towing vehicle, movable frame means defining an elongated track, king pin means mounting said movable frame means on said rigid frame for rotational movement thereon about a generally vertical axis, hoist means mounted on said elongated track for movement longitudinally thereof, said hoist means including an upwardly extending mast, carriage means mounted for movement along said mast between a lowered and an elevated position, vehicle attaching means mounted on said carriage and movable therewith for attaching one end of an automobile to said carriage when said carriage is in said lowered position, and for lifting said one end of said automobile when said carriage is moved to said elevated position, means for moving said hoist means longitudinally of said elongated track from a loading position at the rear of said trailer to a towing position forward of said loading position, and automobile wheel support means for engaging and supporting the wheels on said one end of an automobile being towed by said trailer.

16. An automobile towing trailer as defined in claim 15 further comprising safety means on said movable frame for engaging said hoist means when said hoist means is in said towing position to retain said hoist means against movement along said track while an automobile is being towed by said trailer, and tiedown bracket means on said movable frame for securing an automobile against movement relative to said elongated frame.

17. An automobile towing trailer as defined in claim 16 wherein said means for moving said hoist means comprises power means mounted on said movable frame and operatively connected to said hoist for moving said hoist and an automobile supported thereon from said loading position to said towing position.

18. An automobile towing trailer as defined in claim 17 further comprising power means on said hoist means for moving said carriage means between said lowered and said elevated positions.

19. An automobile towing trailer as defined in claim 18 wherein said wheel support means comprises a pair of fenders mounted one over said wheel means on each side of said rigid frame, said fenders having a shallow depression formed in their respective upper surfaces for receiving said automobile wheels.

20. An automobile towing trailer as defined in claim 19 wherein said wheel means on each side of said rigid frame comprises elongated arm means pivotally mounted intermediate its ends on said frame for rotation about an axis perpendicular to the longitudinal centerline of said trailer, and a pair of wheels mounted in tandem one adjacent each end of said arm for rotation about axes parallel to the axis of rotation of said arm.

21. An automobile towing trailer as defined in claim 20 wherein said fenders are mounted on said arm for rotation therewith about the axis of rotation of said arm.

22. An automobile towing trailer as defined in claim 18 further comprising an elongated light bar mounted adjacent the top of said mast for rotation therewith about said king pin, said light bar extending transversely of said trailer when said elongated frame is in said normal position, whereby said light bar will remain generally perpendicular to longitudinal axis of the automobile being towed.

References Cited
UNITED STATES PATENTS

| | | |
|---|---|---|
| 1,737,753 | 12/1929 | Farnham. |
| 2,564,111 | 8/1951 | Kimball. |
| 3,417,890 | 12/1968 | Yamazaki _____ 280—402 XR |

ALBERT J. MAKAY, Primary Examiner

U.S. Cl. X.R.

280—402; 254—2; 214—331